(12) United States Patent
Williams et al.

(10) Patent No.: US 7,444,960 B1
(45) Date of Patent: Nov. 4, 2008

(54) MUZZLE RELEASE SYSTEM FOR ANIMALS

(76) Inventors: Edward Williams, P.O. Box 28963, Philadelphia, PA (US) 19151; Thinderene Williams, P.O. Box 28963, Philadelphia, PA (US) 19151

( * ) Notice: Subject to any disclaimer, the term of this patent is extended or adjusted under 35 U.S.C. 154(b) by 424 days.

(21) Appl. No.: 11/137,999

(22) Filed: May 27, 2005

(51) Int. Cl.
*A01K 15/04* (2006.01)
(52) U.S. Cl. ............... 119/831; 119/823; 119/761; 119/856; 119/766; 119/832
(58) Field of Classification Search ............ 119/832, 119/823, 831, 712, 761, 766, 776, 792, 850, 119/814, 821, 865, 856; D30/152, 144, 151, D30/156; 54/24
See application file for complete search history.

(56) References Cited

U.S. PATENT DOCUMENTS

| | | | | |
|---|---|---|---|---|
| 872,279 | A * | 11/1907 | Dusenbury | 119/832 |
| 1,082,372 | A * | 12/1913 | Thompson | 119/831 |
| 1,543,960 | A * | 6/1925 | Tobin et al. | 54/80.5 |
| 2,658,478 | A | 11/1953 | Jones | |
| 2,940,425 | A | 6/1960 | Dykens | |
| D217,258 | S * | 4/1970 | Lupo | D30/152 |
| 4,160,428 | A * | 7/1979 | Wilkinson | 119/831 |
| 4,603,659 | A * | 8/1986 | Helphrey | 119/831 |
| 5,099,800 | A | 3/1992 | Fitzpatrick et al. | |
| 5,218,929 | A * | 6/1993 | Michunovich | 119/832 |
| 5,483,214 | A * | 1/1996 | Perreira et al. | 335/205 |
| 5,588,398 | A | 12/1996 | Allen, II et al. | |
| 5,762,030 | A | 6/1998 | Paglericcio et al. | |
| 5,771,668 | A * | 6/1998 | Younger | 54/1 |
| 6,119,633 | A * | 9/2000 | Berke et al. | 119/822 |
| 6,164,246 | A | 12/2000 | Naftaly et al. | |
| 6,467,435 | B2 * | 10/2002 | Stapelfeld et al. | 119/720 |
| 6,578,885 | B1 * | 6/2003 | Tillman | 292/201 |
| 2006/0156998 | A1 * | 7/2006 | Bridy et al. | 119/831 |
| 2007/0039564 | A1 * | 2/2007 | Steunou | 119/831 |

FOREIGN PATENT DOCUMENTS

GB 2143111 A * 2/1985

* cited by examiner

*Primary Examiner*—Andrea M Valenti
(74) *Attorney, Agent, or Firm*—John D. Gugliotta

(57) ABSTRACT

The muzzle release apparatus allows an operator to remotely and wirelessly disengage a restraint system from the snout of an animal. The system is activated using a small hand-held transmitter. A receiver on the collar detects the signal from the transmitter and electronically engages a solenoid mounted on a restraint under the animal's jaw. The solenoid retracts a locking mechanism that secures two metal pins to the restraint. Each pin is attached to a strap that goes around the animal's snout and is permanently mounted to the opposite side of the restraint. When the pins are released from the restraint, the straps slide off the snout allowing the restraint to fall freely away from the jaw area. The plate is attached to a collar around the animal's neck. The plate will stay attached to the collar at all times, even if deactivated.

14 Claims, 5 Drawing Sheets

MUZZLE RELEASE SYSTEM FOR ANIMALS

RELATED APPLICATIONS

Not applicable.

BACKGROUND OF THE INVENTION

1. Field of the Invention

The present invention relates generally to animal harness devices and, more particularly, to a muzzle release system for animals incorporating a wireless release mechanism.

2. Description of the Related Art

Canine attacks on adults, children or other animals are gruesome and sometimes deadly. Canines are used to protect personal property and safety, and are used in law enforcement with admirable results. However, there are occasions when control of the canine is impossible or ineffective. For instance, if the handler is attacked first and the canine is still restrained, the canine is effectively powerless to perform as trained. While muzzles do help control and restrain canines, many animal activists allege that the use of a muzzle is inhumane and causes discomfort to the canine. Furthermore, the time required to remove the muzzle renders the canine ineffective at the instant when swift response and action by the canine is required.

Accordingly, there is a need for a means by which canines may be restrained in a humane manner while still providing almost instantaneous protection of their owner or handler in a manner which is quick, easy and effective.

A search of the prior art did not disclose any patents that read directly on the claims of the instant invention; however, the following references were considered related:

U.S. Pat. No. 6,164,246, issued in the name of Naftaly et al., discloses a remote release muzzle for facilitating the quick release of a muzzle from a remote location;

U.S. Pat. No. 6,119,633, issued in the name of Berke et al., discloses a dog muzzle comprising or including a remotely actuable stun gun;

U.S. Pat. No. 5,762,030, issued in the name of Paglericcio et al. discloses an anti-barking and anti-biting muzzle for dogs;

U.S. Pat. No. 5,588,398, issued in the name of All II, et al. discloses a remotely controllable dog muzzle apparatus;

U.S. Pat. No. 5,099,800, issued in the name of Fitzpatric et al., discloses a muzzle apparatus arranged for mounting to a muzzle portion of an associated canine, wherein the muzzle contains an ultra sound receiver and a scent saturated gauze member to enhance excitement and activity in the dog;

U.S. Pat. No. 2,940,425, issued in the name of Dykens, discloses an electric weaner mounted on a calf's head, thereby allowing the animal to graze or drink without interference;

U.S. Pat. No. 2,658,478, issued in the name of Jones, discloses a mechanism to make it easier to train dogs and to race dogs, wherein a mechanism slight shocks a dog when the dog engages an object with its head.

Consequently, there exists a continuous need for new ideas and enhancements for existing products in the animal muzzle industry.

SUMMARY OF THE INVENTION

It is therefore an object of the present invention to provide a muzzle release apparatus for an animal.

It is another object of the present invention to provide a muzzle release system for a plurality of animals, wherein the system comprises a plurality of muzzles controlled by a remote.

In an exemplary embodiment of the present invention, a muzzle release apparatus is disclosed as comprising a muzzle secured about the snout of an animal, a harness secured about the neck of the animal, and a mechanism for releasing the muzzle from the snout of the animal.

In another exemplary embodiment of the present invention, a muzzle release apparatus is disclosed as comprising a muzzle having straps and a base. The straps are secured about the snout of an animal to the base, the base abutted against the underside of the jaw of the animal, the base having a shield to inhibit the animal from orally grasping an object. A plurality of pins are releasably coupled the straps to the base, each pin comprising an elongated body having a recess. A harness is secured about the neck of the animal, and the harness coupled to the base. A mechanism releasing the pins from the base, thereby disengaging the muzzle from the jaw of the animal. The base has a plurality of openings, each one of the openings receiving one of the pins.

In another exemplary embodiment of the present invention, a muzzle release system is disclosed as comprising a plurality of muzzles, wherein each one of the muzzles comprises straps and a base, the straps secured about the snout of an animal to the base, and the base abutted against the underside of the jaw of the animal. The muzzle includes a harness secured about the neck of the animal, and a mechanism releasing a plurality of pins that releasably couple the straps to the base. The system also comprises a remote operatively coupled to the mechanism of each muzzle.

The muzzle has at least one strap and a restraint. The strap(s) has/have two ends, wherein one end is permanently coupled to the restraint, and an opposing end is releasably coupled to the restraint. The opposing end of the strap has a pin seated onto the restraint, wherein the mechanism releases the pin from the restraint.

The mechanism comprises a solenoid operatively coupled to a stop. The solenoid and the stop are positioned on an underside of the restraint. The stop is mobile between a retracted and an extended position. The stop impinges the pin(s) when in the extended position thereby coupling the strap to the restraint. The stop releases the pin(s) when in the retracted position thereby decoupling the strap from the restraint.

The mechanism may be actuated or set for operation by the use of a reed switch and a magnet, the reed switch placed in the receiver, and the magnet in the transmitter. After actuation, the mechanism may be deployed by a wireless remote transmitter, a voice recognition system operatively coupled to a receiver on the animal and a power supply, an operational control directly mounted to the muzzle or harness, or a combination of the transmitter, the voice recognition system and/or the operational control on the muzzle or harness.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
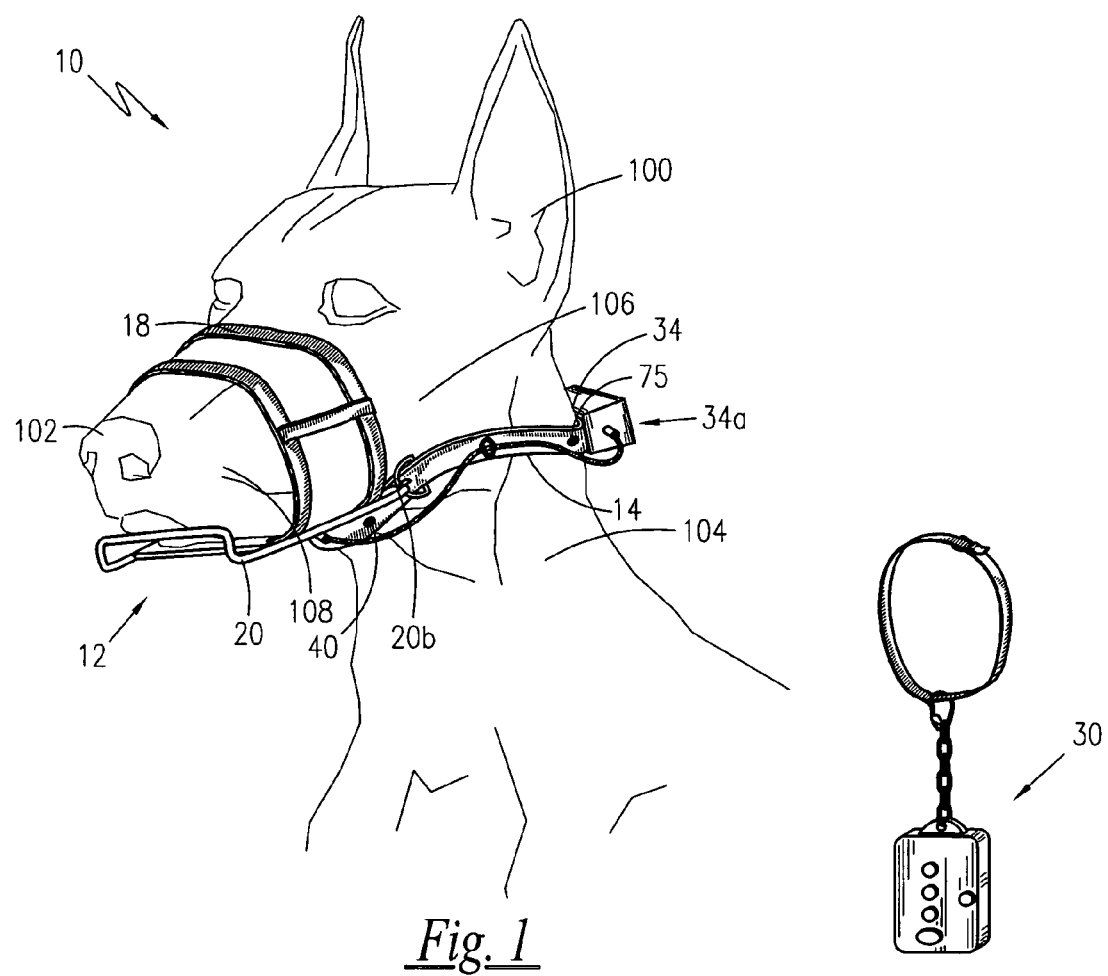
FIG. 1 is a perspective view of the muzzle release apparatus attached to an animal.
Figure 2:
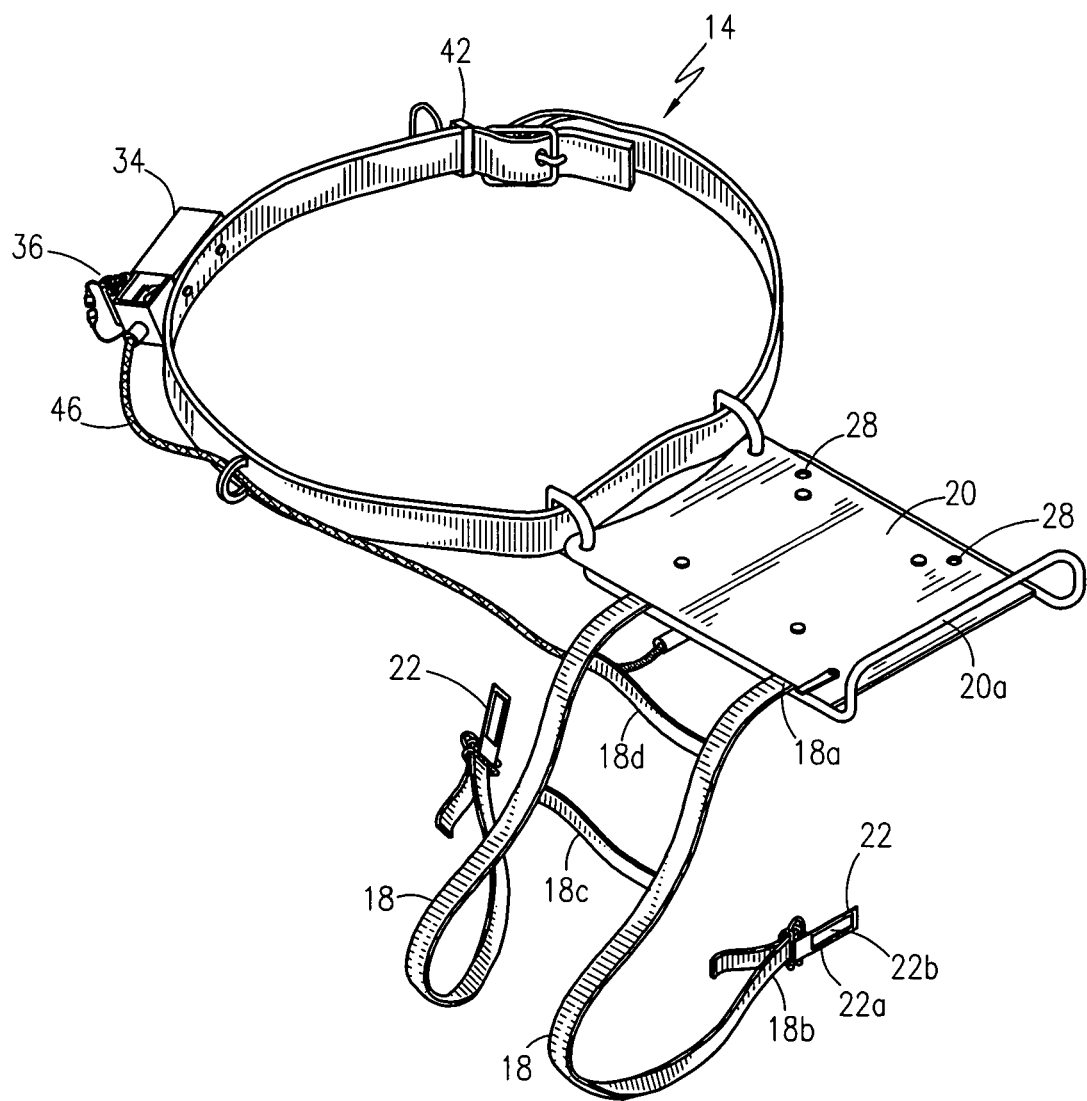
FIG. 2 is a perspective view of the apparatus apart from the animal.
Figure 3:
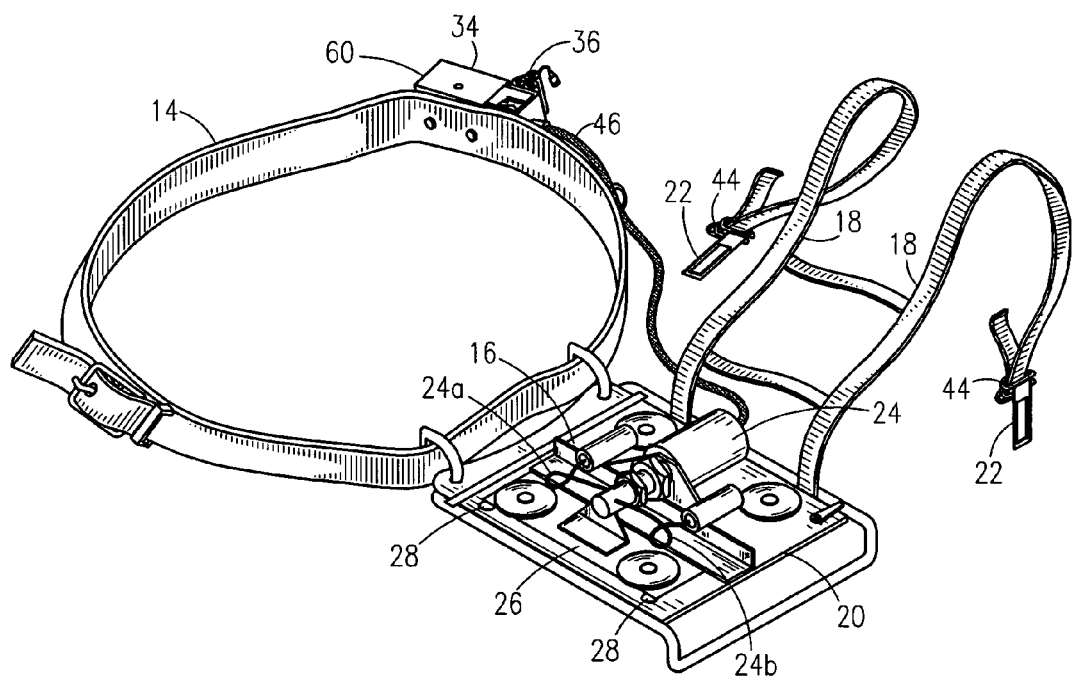
FIG. 3 is a perspective view of the underside of the restraint or base of the apparatus.
Figure 4:
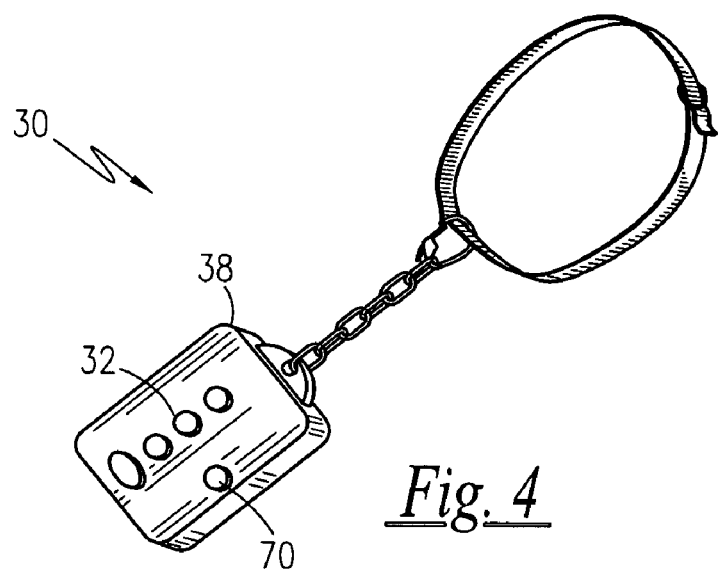
FIG. 4 is a perspective view of the remote control.

The best mode for carrying out the invention is presented in terms of its preferred embodiment, herein depicted within FIGS. 1 through 7.

1. DETAILED DESCRIPTION OF THE FIGURES

Referring now to FIG. 1 through FIG. 4, a muzzle release apparatus 10 is shown in accordance with a preferred embodiment of the present invention, the apparatus placed onto a canine for illustrative purposes only, with the understanding that the general nature of the apparatus includes use on other animals. The apparatus 10 comprises a muzzle 12 secured about the snout 102 of an animal 100, a harness 14 secured about the neck 104 of the animal 100, and a mechanism 16 for releasing the muzzle 12 from the snout 102 of the animal 100.

The muzzle 12 comprises at least one strap 18 and a restraint 20. The strap 18 has two ends 18a and 18b, wherein one end 18a is permanently coupled to the restraint 20, and wherein an opposing end 18b is releasably coupled to the restraint 20. The opposing end 18b of the strap 18 has a pin 22 seated onto the restraint 20. In an alternate embodiment, the muzzle release apparatus 10 comprises a muzzle 12 having a plurality of straps 18, each substantially identical to the other strap(s) 18, and a restraint or base 20. The restraint or base 20 is abutted against the underside of the jaw 106 of the animal 100. The restraint or base 20 may include a hinge 20b or another coupling to the harness 14 so that when the strap(s) 18 is/are released from the restraint or base 20, then the restraint or base 20 may freely fall from the position contacting the jaw of the animal to a position adjacent the sternal portion of the animal. The restraint or base 20 has an obstruction or shield 20a to inhibit the animal 100 from orally grasping an object. The obstruction or shield 20a may comprise a variety of devices, including a cage or grid structure, a crossbar, a bridle or other similar component. In a multi-strap 18 embodiment, a plurality of pins 22 are provided, wherein each one of the plurality of straps 18 has a separate pin 22 that is seated onto the restraint or base 20, thereby coupling each strap 18 to the restraint or base 20. Each pin 22 comprises an elongated body 22a having a recess 22b. The straps 18 may be independent of one another, or integrally coupled to one another by a cross member 18c (or cross members by adding 18d).

The mechanism 16 releases the pin 22 from the restraint 20. The restraint or base 20 has a plurality of openings 28, each one of the openings 28 receiving one of the pins 22. The mechanism 16 comprises a solenoid 24 operatively coupled to a stop 26. The solenoid 24 and the stop 26 are positioned on an underside of the restraint 20. The stop 26 is mobile between a retracted position and an extended position, urged by the solenoid 24 in response to controls input by the user. The stop 26 impinges the pin 22 when in the extended position, thereby coupling the strap 18 to the restraint 20. The stop 26 releases the pin 22 when in the retracted position, thereby decoupling the strap 18 from the restraint 20, and allowing the restraint 20 to fall away from the snout 102, the jaw 106 and the mouth 108 of the animal 100.

The solenoid 24 is operatively coupled to the receiver 34 (shown as a power cord 46) and is therefore responsive to the commands originating from the remote 30 and received by the receiver. The solenoid 24 comprises a piston 24a that extends and retracts in response to commands communicated from the remote 30 to the receiver 34, specifically retracting upon command from the remote 30 and extending upon the urging of outwardly biased springs 24b coupled to the piston 24a. The springs 24b are mounted to an element of the restraint or base 20 or directly to the restraint or base 20, so long as the springs 24b outwardly urge the piston 24a forward so as to urge the stop 26 forward, thus impinging the stop 26 to the recess(es) 22b of pin(s) 22. As will be described in more detail below, the receiver 34 may comprise a circuit that may be opened or closed. A portion of the circuit comprises a reed switch having two magnetic contacts within a glass housing or tube, the housing or tube filled with protective gas. When the contacts of the switch touch, the circuit is closed and electricity flows; when the contacts are not touching, the circuit is opened and electricity flow is inhibited. The polarity of the contacts are altered by the magnet in the transmitter.

Figure 5:
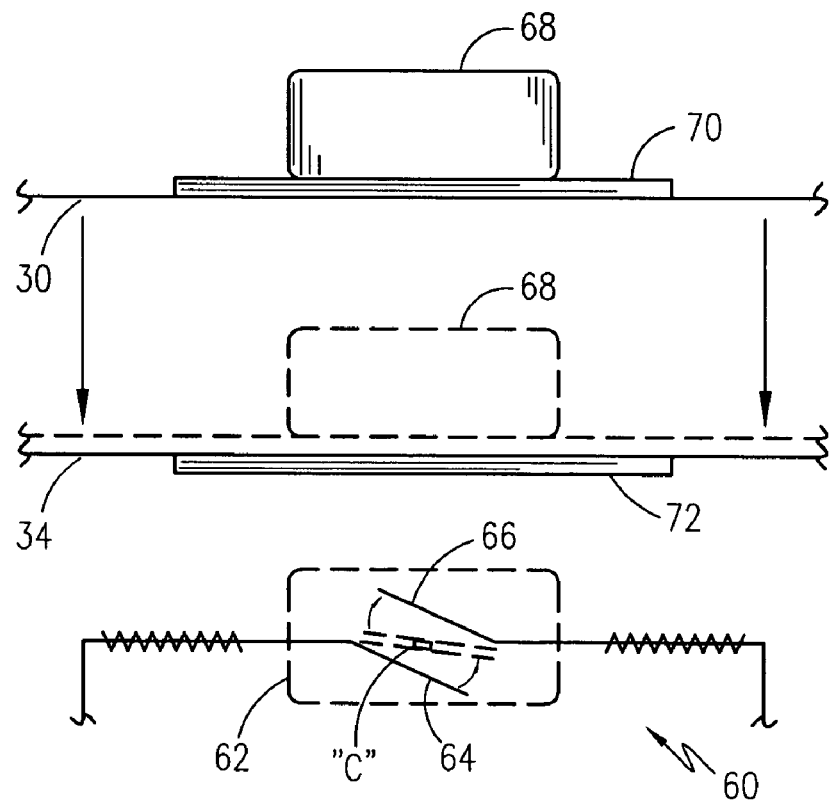
FIG. 5 is an exploded and exposed side view of the transmitter and receiver, illustrating the interaction of the magnet and the reed switch.
Figure 6:
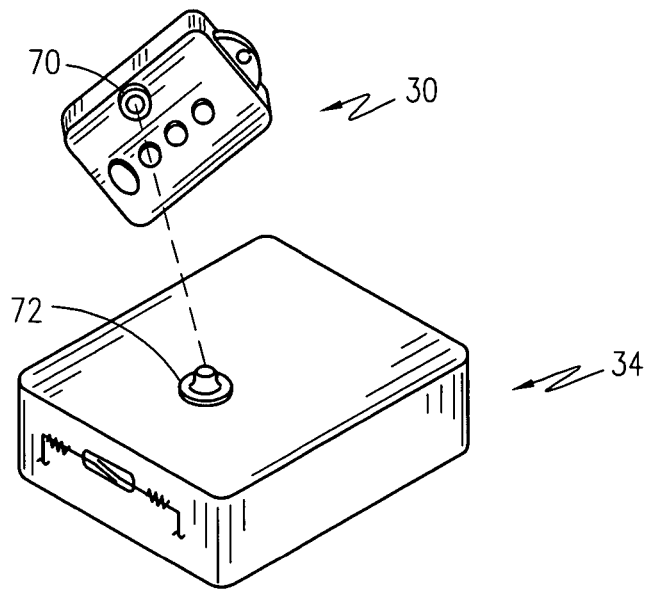
FIG. 6 is a perspective view of the transmitter and receiver.

It is also envisioned that the mechanism 16 may be initially actuated or set for operation by the use of a reed switch 60, placed within the receiver 34, and a magnet 68, placed within the transmitter 30, respectively. As depicted in FIG. 5, the reed switch 60 comprises a glass tube or housing 62 filled with protective gas and has two magnetic contacts 64 and 66. When the magnet 68 comes into close proximity of the contacts 64 and 66, the polarity of the contacts is altered so that the contacts 64 and 66 are attracted to one another (as indicated by the directional arrows in FIG. 6). When contacts 64 and 66 touch (as indicated by the solid block "C"), a circuit is closed and electrical current passes through, thereby providing electricity for the deployment of the mechanism 16. To open the circuit, the magnet 68 is again brought into close proximity of the contacts 64 and 66, altering the polarity so that the contacts repel. To aid in positioning the magnet 68 in proximity to the contacts 64 and 66, indicia 70 and 72 are provided on the transmitter 30 and receiver 34, respectively (as depicted in FIG. 5 and FIG. 6, respectively). Indicia 70 indicates the general location of the reed switch in the receiver 34, while indicia 72 indicates the general location of the magnet 68 in the transmitter. The indicia 70 and 72 may comprise a number of means, including color indicators, geometric shapes, and other similar indicia. Actuation of the mechanism 16 via the reed switch 60 and magnet 68 is indicated by an audible indication (a mechanical "click" or audio "beep", for instance) or visual indication (a "light", for instance).

The mechanism 16 may be deployed by a wireless remote transmitter operatively coupled to a receiver 34 on the animal 100 and a power supply 36. The mechanism 16 may be deployed by a voice recognition system operatively coupled to a receiver 34 on the animal 100 and a power supply 36. The mechanism 16 may be deployed by an attached operational control 40 positioned on the muzzle 12 or the harness 14. The harness 14 is secured about the neck 104 of the animal, and may be further secured or coupled to the restraint or base 20. The receiver 34 may include an indicator 34a to provide visual evidence that the apparatus 10 (or system(s) 50 described below) are operational and in operation mode, or as an indicator for other features desired (such as battery levels, receipt of command, etc.)

All muzzle embodiments, including the single muzzle 12 and each one of the muzzles 12a, 12b and 12c described below corresponding to the system 50 and FIG. 5, are separately responsive to the remote 30. The remote 30 is envisioned as being a wireless remote transmitter operatively coupled to a receiver 34 on the animal 100 and a power supply 36. In an alternate embodiment, the remote 30 is a voice recognition system operatively coupled to a receiver 34 on the animal 100 and a power supply 36. It is envisioned that the remote 30 will be configured for hand held operation or attachment to the hand, wrist, belt, pocket or other accessory or appendage of the user. The remote 30 is envisioned as having a plurality of command control buttons 32 for actuating release of the pin(s) 22 via the urging of the solenoid 24 release sequence. Envisioned buttons 32 include "on/off", "release" (releasing the pin(s) 22 from the restraint or base 20), a key pad for code protection of the remote, and other similar commands.

Figure 7:
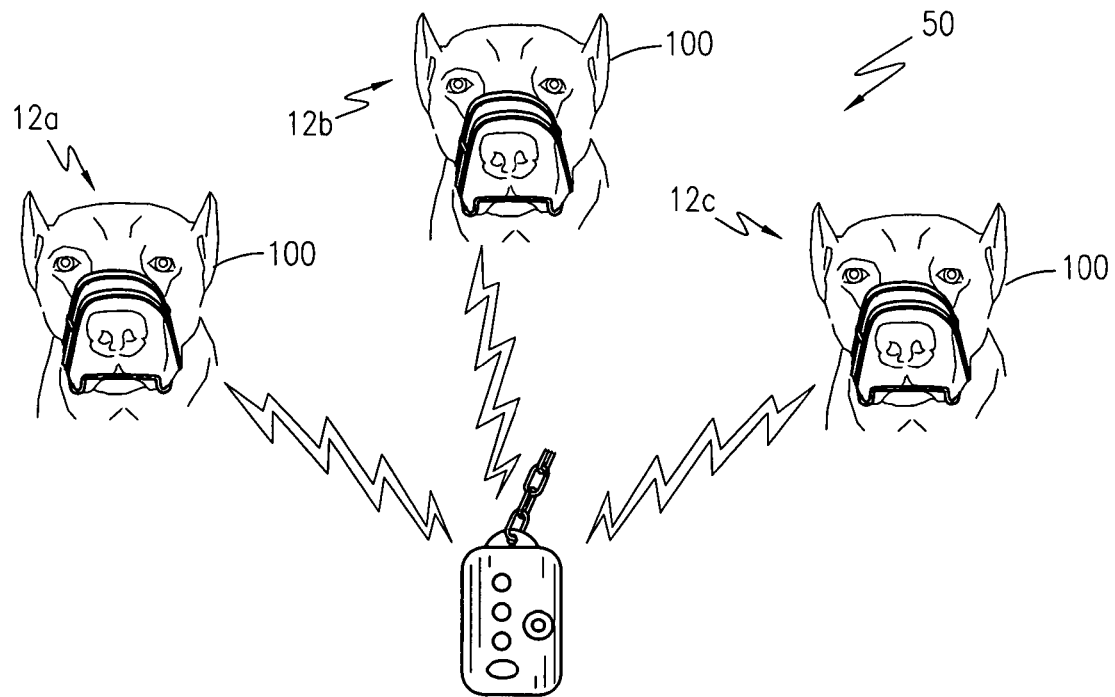
FIG. 7 is a front view of a muzzle release system having multiple sets of muzzles attached to separate animals and operatively coupled to and responsive to a remote control.

Referring now to FIG. 7, a muzzle release system 50 is depicted comprising a plurality of muzzles 12a, 12b and 12c and a remote 30. Each one of the muzzles 12a, 12b and 12c is substantially identical to the muzzle 12 configuration described above in relation to FIG. 1 through FIG. 4, thus a brief description of the system 50 follows that significantly replicates the description of the single muzzle 12 configuration described above, incorporating by reference the details provided above. The muzzles 12a, 12b and 12c each comprise a strap or straps 18 and a restraint or base 20. The strap(s) 18 is/are secured about the snout 102 of an animal 100 to the restraint or base 20. The restraint or base 20 abutted against the underside of the jaw 106 of the animal 100. Each muzzle 12a, 12b and 12c also has a harness 14 secured about the neck 104 of the animal 100. As indicated and disclosed above in relation to the apparatuses described in accordance with FIG. 1 through FIG. 4, each muzzle 12a, 12b and 12c further includes a mechanism 16 releasing one or more pins 22 that releasably couple the strap(s) 18 to the restraint or base 20. Each one of the muzzles 12a, 12b and 12c is separately secured about the snout 102 of a different animal 100, respectively.

The apparatus 10 and/or system 50 may also be controlled by voice recognition or activation 38, configured to deploy the release sequence via voice recognition of the user (as input or programmed before use). It is further contemplated that the voice recognition or activation 38 is integrated with the wireless remote 30 so that the combination is capable of use by the user upon demand.

The harness 14 and strap(s) 18 is/are envisioned as adjustable to accommodate the size and comfort of the animal to which the apparatus 10 and/or 50 system is affixed. The harness 14 is adjustable about a buckle 42 or other similar device (such as a friction fit snap fastener). The strap(s) 18 is/are adjustable by imparting or relaxing tension on the strap (s) 18 and rings 44. Specifically, to tighten the strap(s) 18, the user can pull or tug on the excess portion of the strap(s) 18 at the ring(s) 44 while the pin(s) 22 are securely seated onto the restraint or base 20. Pulling or tugging on the excess of the strap(s) 18 automatically tightens the tension of the strap(s) 18 on the ring(s) 44 that will remain until loosened by the user.

The entire system is made from the best materials available. The solenoid 24 is of the highest quality and should withstand hundreds of thousands of activations (movement). The springs 24b on the solenoid 24 are high tensile steel and should never wear out. The white "washers" on the locking mechanism are hand-made from virgin Teflon and will out live the solenoid 24 (millions of activations). Between the mechanism 16 and the restraint 20 is Teflon tape, preventing the mechanism 16 from wearing into the restraint 20. All straps 18 are envisioned as being made from durable nylon, or another suitable fabric, thereby resisting rot and wear. Any sewing of seams, margins and the like is performed using nylon thread. The restraint or base 20 is made from polycarbonate, thereby resistant to shattering and breaking. The power cord 46 from the solenoid 24 to the receiver 34 is covered with braided stainless steel. It is tear resistant, rust proof, and extremely strong, preventing any damage to the wires. The external circuitry and external batteries are housed in a housing resistant to shattering and breaking. All hardware is high tensile strength steel and will provide years of durability.

It is envisioned that other styles and configurations of the present invention can be easily incorporated into the teachings of the present invention, and only one particular configuration shall be shown and described for purposes of clarity and disclosure and not by way of limitation of scope.

2. OPERATION OF THE PREFERRED EMBODIMENT

To use the preferred embodiment of the present invention, the system 10 is equipped with a power source or supply 36 (envisioned as a battery or batteries of various sizes) to supply power. The harness 14 is placed about the body of the animal 100 (as shown, a canine), with the mechanism 16 affixed thereto. The muzzle 12 is affixed about the animal's snout so that jaw movement is significantly limited. The bands or straps 18 are used to couple the muzzle 12 to the restraint or base 20 by insertion of the pin(s) 22 into the restraint or base 20 so as to be impinged by the solenoid 24 and the stop 26. Upon proper activation, the power supply 36 provides power that urges the solenoid away from the pin(s) 22, thereby releasing impingement of the stop 26 from the recess(es) 24b of the pin(s) 22. The release of the pin(s) 22 allows the muzzle 12, including strap(s) 18 and restraint 20 to fall from the jaw of the animal, thereby allowing the animal to bark, chew or otherwise move the jaws and snout in a normal manner.

To activate the unit, take the transmitter 30 and place against the receiver 34, aligning indicia 70 and 72 so that the polarity of contacts 64 and 66 of reed switch 60 are altered so that contacts 64 and 66 attract and touch one another, thereby closing the circuit through which electricity may pass. An audible or visual indicator will provide evidence that the unit has been activated or actuated for use. Next, connect the harness or collar 14 to the muzzle circuitry by flipping the switch on the front of the receiver 34. The unit is now armed and ready for operation. The transmitter has a plurality of control means or buttons.

To turn the unit off, align the indicia 70 and 72 (from the transmitter and receiver, respectively) to alter the polarity of the contacts 64 and 66 to repel one another and open the circuit and stop the flow of electricity. An audible or visual indicator will provide evidence that the unit has been deactivated.

If the light on the receiver 34 flashes red (or other set color), the unit will need to be recharged, requiring approximately 9 hours to fully charge the internal batteries. If the light is a solid red, the unit will need to be reset by aligning the two indicia 70 and 72 again. The unit will then be ready for activation or turn off.

The collar and snout straps are adjustable for different size dogs. To tighten the snout straps, simply pull on the loose end while the pins are locked into the base plate. They will automatically tightened and stay tightened until you manually take the tension off the rings. The neck collar adjusts with the buckle.

On the bottom of the unit, you will find the locking mechanism. To arm the unit, slid the locking mechanism back and place pins through the base plate. Make sure the "notch" on the pin faces towards the locking mechanism. The pins will automatically seat themselves and be locked into the plate The system requires no maintenance other than cleaning if the unit is soiled. The entire unit is water resistant, and may be configured to be waterproof. If the animal likes swimming or bathing, it is recommended that the system be removed. Inspect the system after each use to ensure there is no debris or foreign objects that would prevent the unit from working normally.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A muzzle release apparatus, comprising:
   a muzzle secured about the snout of an animal;
   a harness secured about the neck of the animal, said harness coupled to said muzzle; said muzzle comprising at least one strap and a restraint, said at least one strap having two ends, wherein one end is permanently coupled to said restraint, and wherein an opposing end is releasably coupled to said restraint, said restraint positioned on the underside of the snout of the animal, and
   wherein said opposing end of said at least one strap has a pin seated onto said restraint and a mechanism releasing said muzzle from the snout of the animal, wherein said mechanism releases said pin from said restraint; and
   wherein said mechanism comprises:
      a solenoid operatively coupled to a stop, said solenoid and said stop positioned on an underside of said restraint;
      said stop mobile between a retracted and an extended position, said stop impinging said at least one pin when in the extended position thereby coupling said strap to said restraint, said stop releasing said pin when in the retracted position thereby decoupling said strap from said restraint.

2. The apparatus of claim 1, wherein said mechanism is deployed by a wireless remote transmitter operatively coupled to a receiver on said harness and a power supply.

3. The apparatus of claim 1, wherein said mechanism is deployed by a voice recognition system operatively coupled to a receiver on said animal and a power supply.

4. The apparatus of claim 1, wherein said mechanism is deployed by an attached operational control.

5. The apparatus of claim 1, wherein a transmitter comprises a magnet and a receiver comprises:
   a circuit coupled to a reed switch;
   said reed switch comprising a glass housing and having a pair of magnetic contacts entering said housing at opposing ends;
   said magnetic contacts separated by a distance in a first position, wherein electricity flow is inhibited by said first position;
   said magnetic contacts touching in a second position, wherein electricity flow is permitted by said second position;
   said magnet altering a polarity of said contacts to yield said second position and supplying electricity between said receiver and a solenoid, thereby activating said apparatus; and
   said magnet altering said polarity of said contacts to yield said first position and terminating said electricity between said receiver and said solenoid, thereby deactivating said apparatus;
wherein said muzzle comprises at least one strap and a restraint, said at least one strap having a first end permanently coupled to said restraint, and wherein a pin comprised on a distal end of said strap removably inserts into an aperture formed through an opposing end of said restraint.

6. A muzzle release apparatus comprising:
   a muzzle having straps permanently coupled at their first ends to a base, said straps secured about a snout of the animal to said base, said base abutted against the underside of said jaw of said animal, said base having a shield to inhabit said animal from orally grasping an object;
   a plurality of pins formed on a distal end of said straps to releasably couple said straps to said base, wherein each one of said pins comprises an elongated body having a recess that inserts through corresponding apertures formed on an opposite side of said base;
   a harness secured about the neck of said animal, said harness coupled to said base; and
   a solenoid to impinge said recesses of said pins to a body of said base when said pins are inserted through said aperture, thereby engaging said muzzle and a mechanism releasing said pins from said base, thereby disengaging said muzzle from the jaw of said animal.

7. The apparatus of claim 6, wherein said solenoid is operatively coupled to a stop, said solenoid and said stop positioned on an underside of said base;
   said stop mobile between a retracted and an extended position, said stop engaging said pins at said recesses when in said extended position thereby impinging said pins and coupling said straps to said base, said stop releasing said pins when in the retracted position thereby decoupling said strap from said base.

8. The apparatus of claim 7, wherein said solenoid is deployed by a wireless remote transmitter operatively coupled to a receiver on said harness and a power supply.

9. The apparatus of claim 7, wherein said solenoid is deployed by a voice recognition system operatively coupled to a receiver on said animal and a power supply.

10. The apparatus of claim 7, wherein said solenoid is deployed by an attached operational control.

11. The apparatus of claim 7, wherein a transmitter comprises a magnet and a receiver comprises:
   a circuit coupled to a reed switch;
   said reed switch comprising a glass housing and having a pair of magnetic contacts entering said housing at opposing ends;
   said magnetic contacts separated by a distance in a first position, wherein electricity flow is inhibited by said first position;
   said magnetic contacts touching in a second position, wherein electricity flow is permitted by said second position;

said magnet altering the polarity of said contacts to yield said second position and supplying electricity between said receiver and said solenoid, thereby activating said apparatus; and said magnet altering the polarity of said contacts to yield said first position and terminating said electricity between said receiver and said solenoid, thereby deactivating said apparatus.

12. A muzzle release system comprising:
a plurality of muzzles, wherein each one of said muzzles comprises:
straps and a base, said straps secured about the snout of an animal to said base, said base abutted against the underside of the jaw of the animal, said base having a shield to inhibit the animal from orally rasping an object;
a harness secured about the neck of the animal and coupled to said base;
a plurality of pins releasably coupling said straps to said base;
a mechanism releasing said plurality of pins wherein:
said pins are formed at an end of each respective said strap, and wherein each one of said pins comprises an elongated body having a recess;
said base has a plurality of openings, each one of said openings receiving one of said pins; a solenoid impinges said recess of said pins to said base when said pins are inserting through the openings in the base; and
a remote operatively coupled to said mechanism of each said muzzle;
wherein each one of said muzzles is separately secured about the snout of a different animal, each one of said muzzles separately responsive to said remote.

13. The apparatus of claim 12, wherein a solenoid is operatively coupled to a stop, said solenoid and said stop positioned on an underside of said base;
said stop mobile between a retracted and an extended position, said stop engaging said pins at said recesses when in an extended position thereby impinging said pins and coupling said straps to said base, said stop releasing said pins when in a retracted position thereby decoupling said strap from said base.

14. The apparatus of claim 13, wherein a transmitter comprises a magnet and a receiver comprises:
a circuit coupled to a reed switch;
said reed switch comprising a glass housing and having a pair of magnetic contacts entering said housing at opposing ends;
said magnetic contacts separated by a distance by a first position, wherein electricity flow is inhibited by said first position;
said magnetic contacts touching in a second position, wherein electricity flow is permitted by said second position;
said magnet altering a polarity of said contacts to yield said second position and supplying electricity between said receiver and a solenoid, thereby activating said apparatus; and
said magnet altering said polarity of said contacts to yield said first position and terminating said electricity between said receiver and said solenoid, thereby deactivating said apparatus.

* * * * *